United States Patent
Kato et al.

(10) Patent No.: US 9,273,759 B2
(45) Date of Patent: Mar. 1, 2016

(54) CHAIN GUIDE AND CHAIN TRANSMISSION DEVICE

(75) Inventors: Akio Kato, Iwata (JP); Shinji Oishi, Iwata (JP)

(73) Assignee: NTN Corporation, Osaka (JP)

(*) Notice: Subject to any disclaimer, the term of this patent is extended or adjusted under 35 U.S.C. 154(b) by 0 days.

(21) Appl. No.: 14/347,253

(22) PCT Filed: Sep. 6, 2012

(86) PCT No.: PCT/JP2012/072708
§ 371 (c)(1),
(2), (4) Date: Apr. 7, 2014

(87) PCT Pub. No.: WO2013/047138
PCT Pub. Date: Apr. 4, 2013

(65) Prior Publication Data
US 2014/0287861 A1    Sep. 25, 2014

(30) Foreign Application Priority Data
Sep. 28, 2011    (JP) .................................. 2011-212366

(51) Int. Cl.
| | | |
|---|---|---|
| *F16H 7/12* | (2006.01) | |
| *F16H 7/18* | (2006.01) | |
| *F16H 7/08* | (2006.01) | |
| *F16H 7/20* | (2006.01) | |

(52) U.S. Cl.
CPC .. F16H 7/12 (2013.01); F16H 7/18 (2013.01); *F16H 7/1281* (2013.01); *F16H 7/20* (2013.01); *F16H 2007/0842* (2013.01); *F16H 2007/0865* (2013.01)

(58) Field of Classification Search
CPC ................ F16H 2007/0874; F16H 2007/0893; F16H 7/1254; F16H 2007/088; F16H 7/08
USPC ................................................... 474/134, 135
See application file for complete search history.

(56) References Cited

U.S. PATENT DOCUMENTS

| | | | | |
|---|---|---|---|---|
| 1,338,293 | A * | 4/1920 | Fuchs ........................... | 474/134 |
| 1,914,908 | A * | 6/1933 | Buckley ........................ | 474/132 |

(Continued)

FOREIGN PATENT DOCUMENTS

| | | |
|---|---|---|
| JP | 2001-187948 | 7/2001 |
| JP | 2005-249112 | 9/2005 |

(Continued)

OTHER PUBLICATIONS

International Search Report issued Dec. 11, 2012 in International (PCT) Application No. PCT/JP2012/072708.

(Continued)

*Primary Examiner* — Henry Liu
(74) *Attorney, Agent, or Firm* — Wenderoth, Lind & Ponack, L.L.P.

(57) ABSTRACT

A chain guide having excellent durability is provided. The chain guide includes a guide base arranged along a portion of an outer periphery of a chain for transmitting torque and elongated in the direction in which the chain travels; a plurality of roller shafts attached to the guide base so as to be spaced apart from each other along the direction in which the chain travels; and rollers rotatably supported by the respective roller shafts. The distance between the centers of each adjacent pair of the rollers is set to be shorter in the area where a larger load is applied to the rollers.

6 Claims, 7 Drawing Sheets

(56) References Cited

U.S. PATENT DOCUMENTS

| | | | | |
|---|---|---|---|---|
| 1,919,315 | A * | 7/1933 | Baker et al. | 305/154 |
| 3,930,323 | A * | 1/1976 | Marold et al. | 37/423 |
| 4,141,245 | A * | 2/1979 | Brandstetter | 73/862.46 |
| 4,361,363 | A * | 11/1982 | Livesay | 305/125 |
| 6,165,089 | A * | 12/2000 | McGreal et al. | 474/101 |
| 6,179,740 | B1 * | 1/2001 | Walker | 474/134 |
| 6,346,057 | B1 * | 2/2002 | Edelmann | 474/135 |
| 6,592,481 | B2 * | 7/2003 | Sato et al. | 474/134 |
| 2008/0070730 | A1 * | 3/2008 | Nelson et al. | 474/134 |
| 2008/0070731 | A1 * | 3/2008 | Vrsek et al. | 474/134 |
| 2011/0294612 | A1 * | 12/2011 | Kato | 474/91 |

FOREIGN PATENT DOCUMENTS

| | | |
|---|---|---|
| JP | 2011-089553 | 5/2011 |
| WO | 2010/090139 | 8/2010 |

OTHER PUBLICATIONS

Written Opinion of the International Searching Authority, issued Dec. 11, 2012 in International (PCT) Application No. PCT/JP2012/072708 (with English translation).

* cited by examiner (a)

(b)

CHAIN GUIDE AND CHAIN TRANSMISSION DEVICE

TECHNICAL FIELD

The present invention relates to a chain guide for guiding the movement of a chain for transmitting torque, and to a chain transmission device using the chain guide.

BACKGROUND ART

In an automobile engine, rotation of a crankshaft is transmitted to a camshaft by means of a timing chain (hereinafter, simply referred to as a "chain"), to open and close valves of combustion chambers by rotating the camshaft.

Chain transmission devices are used to drive such camshafts. Many of such chain transmission devices include a driving sprocket attached to the crankshaft, a driven sprocket attached to the camshaft, a chain trained around the driving sprocket and the driven sprocket, a pivotable chain guide arranged at the loose side of the chain, a chain tensioner pressing the chain guide against the chain, and a fixed chain guide arranged at the tension side of the chain.

The pivotable chain guide is biased by the chain tensioner, so as to press the chain. As a result thereof, tension of the chain is kept constant. The fixed chain guide controls vibration of the chain while keeping an ideal travelling line of the chain.

As the pivotable chain guide or the fixed chain guide, which is used in the above chain transmission devices, sliding type chain guides are known of which the guiding surface extending along the travel direction of the chain is brought into sliding contact with the chain. Since the chain guides of this type are brought into sliding contact with the chain, resistance to travelling of the chain is large. Therefore, transmission loss of torque is large.

In order to overcome this problem, the inventors of the present invention have proposed in the below-identified Patent document 1 a chain guide including a plurality of rollers spaced apart from each other along the travel direction of the chain such that the chain is guided by the respective rollers.

Since this chain guide is in rolling contact with the chain (rolling type), resistance to travelling of the chain is small. Therefore, transmission loss of torque is small.

PRIOR ART DOCUMENT(S)

Patent Document(S)

Patent document 1: PCT International Publication No. 2010/090139.

SUMMARY OF THE INVENTION

Problems to be Solved by the Invention

In order to evaluate durability of the chain guide of the above rolling type, the inventors of the present invention performed an experiment. Specifically, the inventors first prepared a testing machine in which a chain is trained around a driving sprocket attached to a crankshaft and a driven sprocket attached to a camshaft such that the movement of the chain is guided by the chain guide of the rolling type, and performed the experiment, in which the crankshaft of the testing machine was rotated in the red zone.

As a result of this experiment, it was confirmed that even after the crankshaft was rotated in the red zone for several thousand hours, respective rollers of the chain guide were not damaged and thus were usable, and that the chain guide of the rolling type was barely durable for practical use. However, after the inventors continued the experiment further for a long time, the inventors discovered that scaly flaking developed on roller shafts supporting the respective rollers or on roller elements at times. The inventors discovered a certain tendency in the distribution of roller shafts which suffer from flaking.

Namely, an endurance test was conducted using a chain guide including a guide base which is supported so as to be pivotable about its end portion near the camshaft and in which its end portion near the crankshaft is pressed by the chain guide, a plurality of roller shafts attached to the guide base so as to be spaced apart from each other along the travel direction of the chain, and rollers rotatably supported by the respective roller shafts. As a result thereof, the inventors discovered that when this chain guide reaches the end of its service life (becomes unusable) due to flaking on the roller shafts, flaking tends to occur not on the roller shafts in the area of the guide base near the camshaft but on the roller shafts in the area of the guide base near the crankshaft.

The inventors of the present invention performed the endurance test under various test conditions to investigate the cause of the above tendency. As a result thereof, the inventors discovered that the cause thereof stems mainly from the following two points.

(1) If the respective rollers are arranged such that the farther any particular one of virtual circular arcs is located from the end portion of the guide base near the camshaft (and the closer to the end portion of the guide base near the crankshaft), the virtual circular arcs being each drawn to pass the center of one of the rollers and the centers of two of the rollers adjacent to both sides of the one roller, the shorter the radius of the particular virtual circular arc is, which makes it possible to maximize the winding angle of the chain around the driving sprocket of the crankshaft, thus minimizing a load applied per tooth of the driving sprocket of the crankshaft. If the respective rollers are arranged in this way, the chain is curved to a large degree in its travel direction in the area where the radius of the particular virtual circular arc is short (area of the guide base near the crankshaft), which is drawn to pass the center of one of the rollers and the centers of two of the rollers adjacent to both sides of the one roller. Therefore, a larger load tends to be applied to the rollers in such an area by the chain.

(2) The rollers located near the end portion of the guide base pressed by a chain tensioner are closer to the point of action of pressing force of the chain tensioner than the rollers located near the end portion of the guide base, about which the guide base is pivotable. Therefore, a larger load tends to be applied from the chain tensioner to the rollers near the end portion of the chain guide pressed by the chain tensioner.

It is an object of the present invention to provide a chain guide having excellent durability.

Means for Solving the Problems

In order to achieve the above object, the present invention provides a chain guide including: a guide base configured to be arranged along a portion of the outer periphery of a chain for transmitting torque and elongated in the direction in which the chain travels; a plurality of roller shafts attached to the guide base so as to be spaced apart from each other along the direction in which the chain travels; and rollers rotatably supported by the respective roller shafts, wherein the distance between the center of each adjacent pair of the rollers is set to be shorter in the area where a larger load is applied to the rollers.

As described above, since the distance between the centers of each adjacent pair of the rollers is shorter in the area where a larger load is applied to the rollers, loads applied to the respective rollers are made uniform. As a result thereof, it is possible to extend a service life of the roller shafts supporting the respective rollers as a whole and to obtain a chain guide having excellent durability.

If the respective rollers are arranged such that the farther any particular one of virtual circular arcs is located from the first end portion of the guide base (and thus the closer to the second end portion of the guide base), the virtual circular arc being each drawn to pass the center of one of the rollers and the centers of two of the rollers adjacent to both sides of the one roller, the shorter the radius of the particular virtual circular arc is, a larger load is applied to the rollers in the area where the radius of the particular virtual circular arcs is shorter. Also, if the guide base is supported so as to be pivotable about the first end portion of the guide base, and the second end portion of the guide base is pressed by a chain tensioner, a larger load is applied to the rollers in the area closer to the second end portion pressed by the chain tensioner.

It is preferable that the respective roller shafts, which support the rollers, are solid and columnar members to which bright quenching is performed.

Only some of the rollers may be arranged at unequal intervals with the remaining rollers arranged at equal intervals. However, if all of the rollers are arranged at unequal intervals, it is possible to disperse more effectively loads applied to the respective rollers.

The present invention also provides a chain transmission device in which the above chain guide is used, the device including: the chain trained around a driving sprocket and driven sprockets; the above pivotable chain guide provided at the loose side of the chain; and a chain tensioner configured to press the chain guide against the chain.

Effects of the Invention

Since the chain guide according to the present invention is configured such that the distances between the centers of adjacent pairs of the rollers are shorter in the area where a larger load is applied to the rollers, loads applied to the respective rollers are made uniform, thus enabling to make the chain guide excellent in durability.

DETAILED DESCRIPTION OF THE INVENTION

Figure 1:
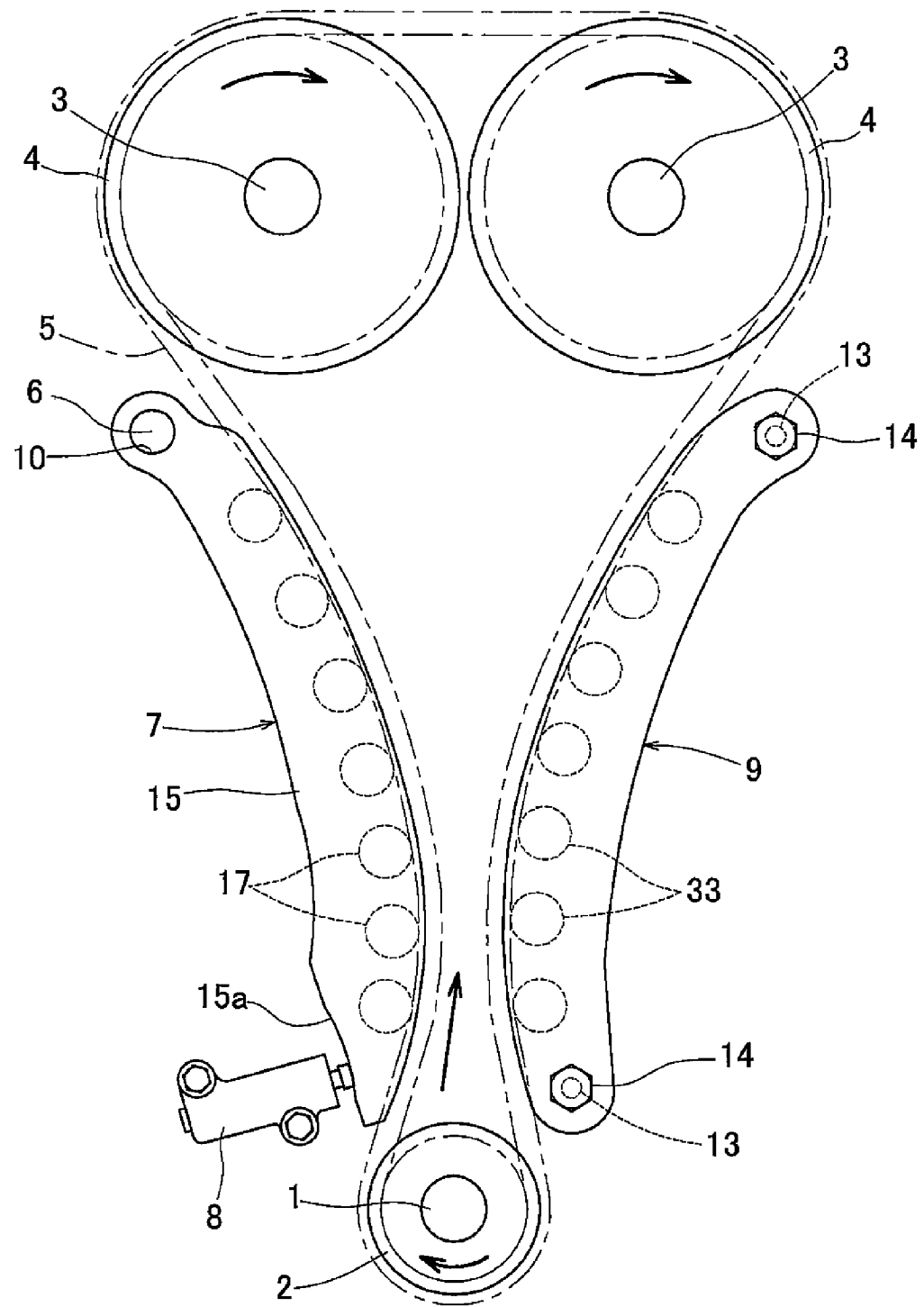
FIG. 1 is a schematic diagram of a chain transmission device according to an embodiment of the present invention.

FIG. 1 illustrates a chain transmission device in which the chain guides according to the embodiment of the present invention are incorporated. This chain transmission device includes a driving sprocket 2 fixed to a crankshaft 1 of an engine, driven sprockets 4 fixed to respective camshafts 3, and a chain 5 trained around the driving sprocket 2 and the driven sprockets 4. Rotation of the crankshaft 1 is transmitted to the camshafts 3 by means of the chain 5, to open and close valves of combustion chambers (not illustrated in the drawings) by rotating the camshafts 3.

The crankshaft 1 always rotates in the same direction (clockwise direction in FIG. 1) while the engine is operating. While the crankshaft 1 is rotating, a portion of the chain 5 is pulled by the driving sprocket 2 and becomes tensioned. This portion of the chain 5 is therefore called the "tension side". Another portion of the chain 5 is pushed by the driving sprocket 2 and becomes loose. This portion is therefore called the "loose side". The chain transmission device includes a chain guide 7 arranged at the loose side of the chain 5 and supported by a fulcrum shaft 6 so as to be pivotable about the fulcrum shaft 6, and a chain tensioner 8 pressing the chain guide 7 against the chain 5. The chain transmission device further includes a fixed chain guide 9 arranged at the tension side of the chain 5.

The chain guide 7 has a shape elongated along the chain 5. The fulcrum shaft 6 is inserted in an inserting hole 10 formed in the end portion of the chain guide 7 near the camshaft 3 and supports the chain guide 7 so as to be pivotable about the fulcrum shaft 6. The chain tensioner 8 is in contact with the end portion of the chain guide 7 near the crankshaft 1 such that the chain guide 7 is pressed against the chain 5 by the chain tensioner 8.

The fixed chain guide 9 as well as the pivotable chain guide 7 has a shape elongated along the chain 5. Bolts 14 are inserted in inserting holes 13 formed in the end portions of the fixed chain guide 9 near the camshaft 3 and the crankshaft 1, respectively, such that the chain guide 9 is fixed by means of fastening of the bolt 14.

Figure 2:
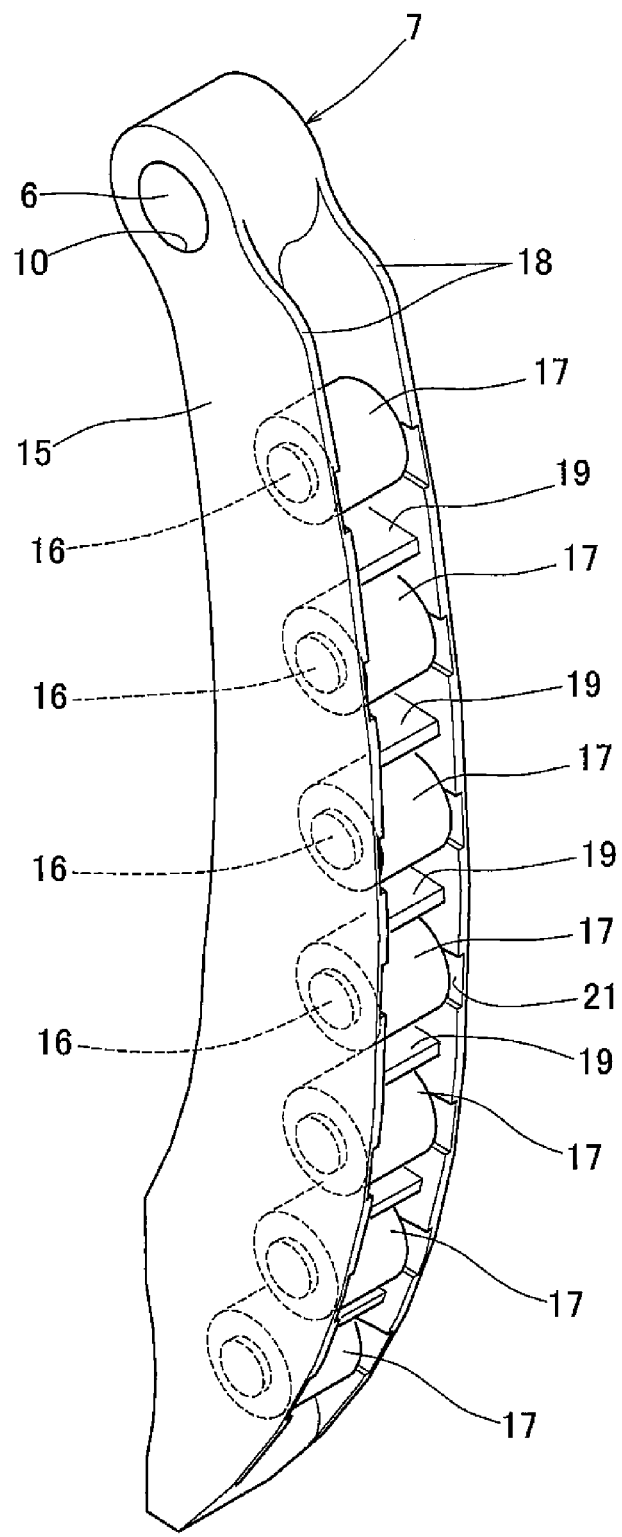
FIG. 2 is a perspective view of a chain guide illustrated in FIG. 1.
Figure 3:
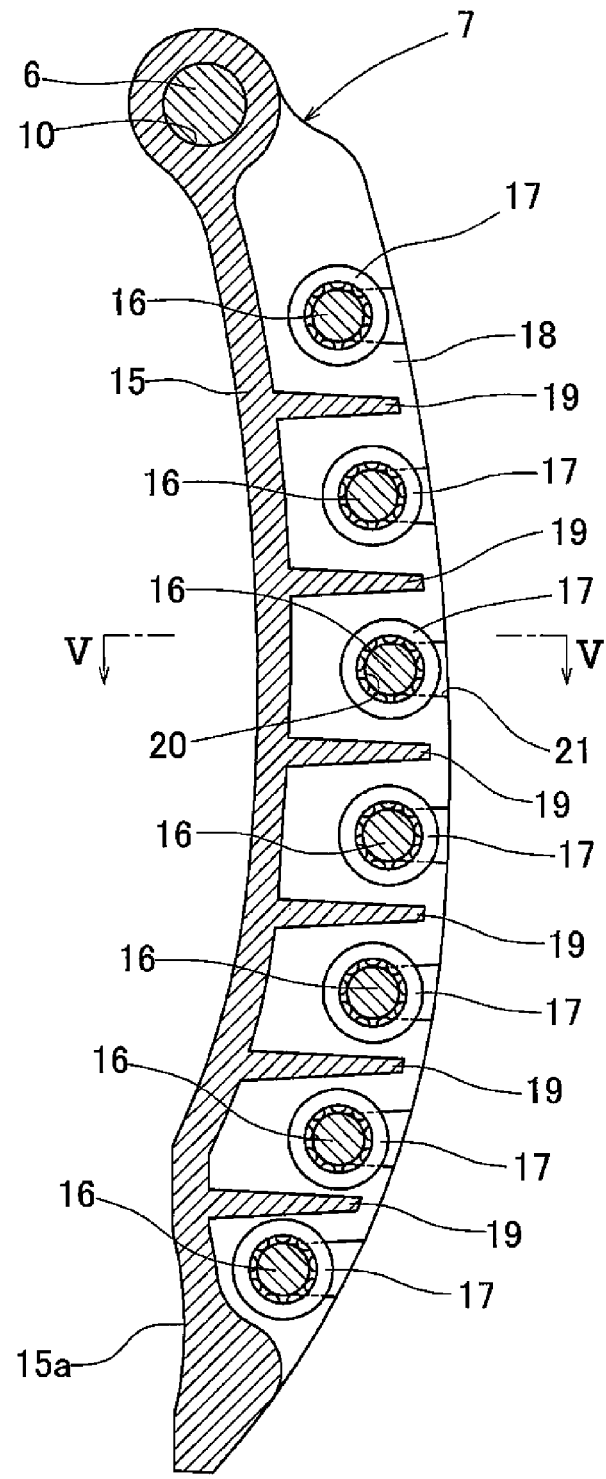
FIG. 3 is a longitudinal sectional view of the chain guide illustrated in FIG. 2.
Figure 4:
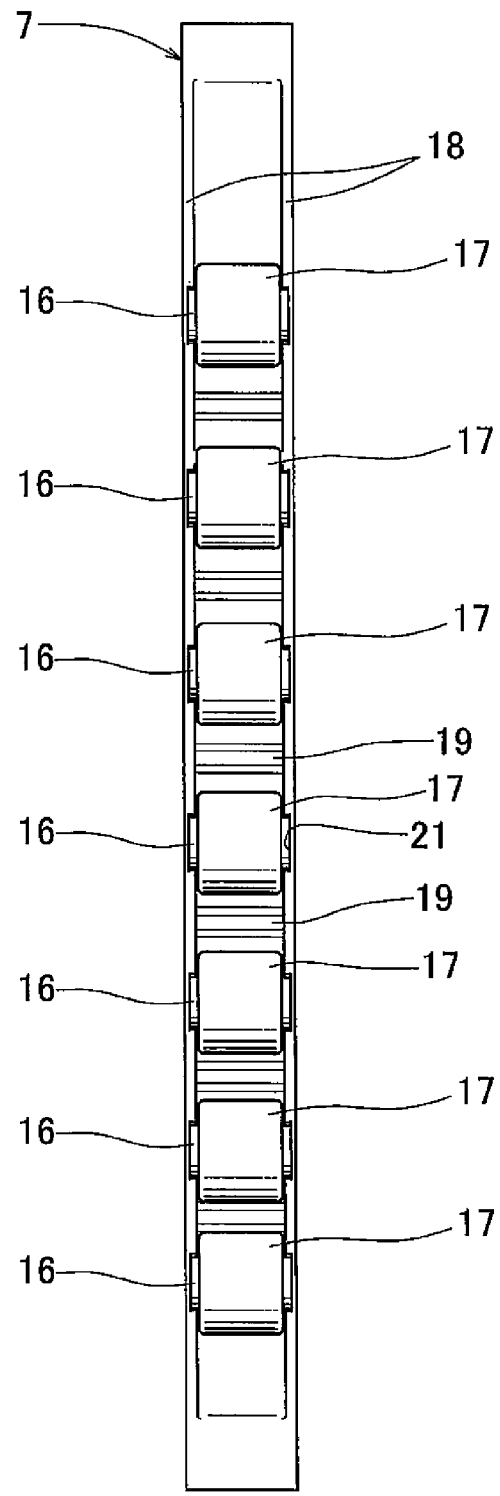
FIG. 4 is a right side view of the chain guide illustrated in FIG. 3.

As illustrated in FIGS. 2 to 4, the chain guide 7 includes a guide base 15 having a shape extending along the travel direction of the chain 5, a plurality of roller shafts 16 attached to the guide base 15 so as to be spaced apart from each other along the travel direction of the chain 5, and rollers 17 rotatably supported by the respective roller shafts 16.

As illustrated in FIG. 3, the guide base 15 is provided in one end portion thereof (end portion thereof near the camshaft 3 illustrated in FIG. 1) with the inserting hole 10 and in the other end thereof (end portion thereof near the crankshaft 1 illustrated in FIG. 1) with a receiving portion 15a. As illustrated in FIG. 1, this guide base 15 is supported by the fulcrum shaft 6 so as to be pivotable about the fulcrum shaft 6, and the receiving portion 15a is pressed by the chain tensioner 8.

Figure 7:
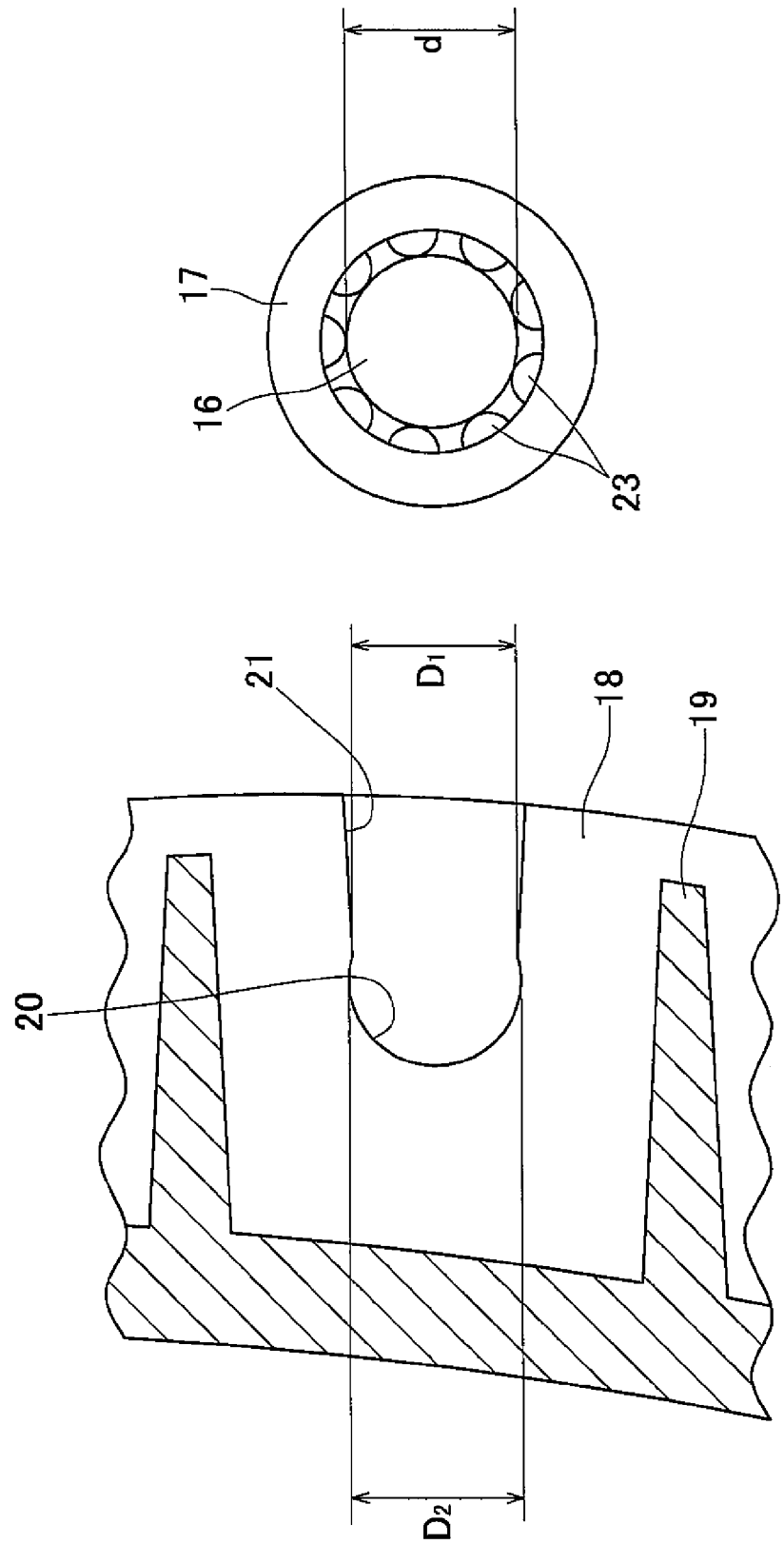
FIG. 7 is an exploded front view of a portion of a guide base and the roller.

As illustrated in FIG. 2 and FIG. 4, the guide base 15 includes a pair of opposed side plates 18 elongated along the travel direction of the chain 5 and supporting both ends of the respective roller shafts 16, and a plurality of coupling portions 19 which are arranged between the adjacent roller shafts 16 and through which the side plates 18 are coupled together. The respective coupling portions 19 are fixed at both ends thereof to the side plates 18 so as to retain the distance between the opposed side plates 18. As illustrated in FIG. 3 and FIG. 7, the respective side plates 18 are formed in their inner opposed surfaces with circular recesses 20 supporting the axial ends of the respective roller shafts 16, and with shaft introducing grooves 21 extending to the respective circular recesses 20 from the convex edges of the respective side plates 18.

As illustrated in FIG. 7, each of the shaft introducing grooves 21 is formed in a tapered shape such that the groove width thereof gradually decreases toward the circular recess 20 from the convex edge of the side plate 18. The ends of the roller shafts 16 are each passed through the shaft introducing groove 21 and introduced into the circular recess 20. In order to prevent the end of the roller shaft 16 in each of the circular recesses 20 from moving back into the shaft introducing groove 21, the shaft introducing groove 21 is formed such that the width $D_1$ of the narrowest portion of the shaft introducing groove 21 is smaller than the inner diameter $D_2$ of the circular recess 20.

The inner diameter $D_2$ of the circular recesses 20 is slightly smaller than the outer diameter d of the ends of the roller shafts 16 such that the ends of the roller shafts 16 are fitted in the circular recesses 20 with an interference.

The guide base 15 can be formed by injection molding of a fiber-reinforced synthetic resin. The synthetic resin forming the guide base 15 may be, for example, polyamide (PA) such as nylon 66 or nylon 44. The reinforcing fiber mixed in the synthetic resin may be glass fiber, carbon fiber or aramid fiber, and so on. The guide base 15 may be formed of light metal such as an aluminum alloy or a magnesium alloy.

The roller shaft 16 is a solid and columnar member made of, e.g., a steel material such as SUJ2 or SC material (carbon steel for machine construction). Bright quenching is performed to the roller shaft 16 so as to enhance wear resistance of the surface of the roller shaft 16.

Figure 5:
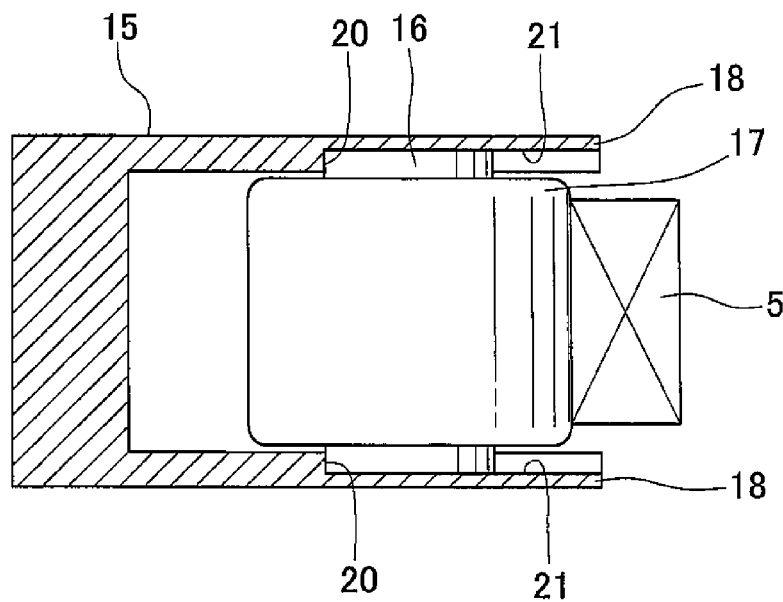
FIG. 5 is a sectional view taken along the line V-V of FIG. 3.
Figure 6:
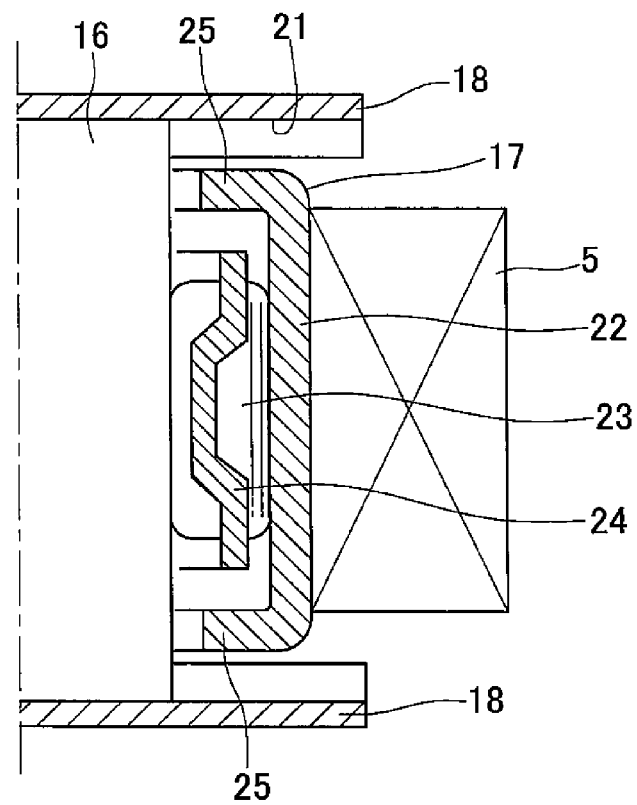
FIG. 6 is an enlarged sectional view of the roller illustrated in FIG. 5.

As illustrated in FIG. 5 and FIG. 6, the rollers 17 are rotatably mounted on the outer peripheries of the respective roller shafts 16 such that the cylindrical surfaces formed on the outer peripheries of the rollers 17 contact the chain 5. The rollers 17 are roller bearings each including an outer race 22, a plurality of roller elements 23 incorporated in the outer race 22, and a retainer 24 retaining the roller elements 23. The outer race 22 is a shell type (i.e. cup-shaped) outer race formed by drawing a steel plate such as SPC or SCM. Inwardly extending flanges 25 are formed at both ends of the outer race 22. The outer diameter of the outer race 22 is set to be in the range of 10 mm to 25 mm, and all of the outer races 22 are equal in outer diameter to each other.

In this embodiment, the rollers 17 each consist only of a roller bearing so as to lighten the rollers 17 and thus minimize resistance to traveling of the chain 5. However, the roller 17 may further include a cylindrical member made of resin or iron and attached to the outer periphery of the outer race 22 of the roller bearing. Also, bearings other than roller bearings may be used. The roller bearings used in this invention are cylindrical roller bearings or needle roller bearings.

The arrangements of the respective rollers 17 illustrated in FIG. 1 are now described considering virtual circular arcs drawn, each passing the center of one of the rollers 17 and the centers of two of the rollers 17 adjacent to both sides of the one roller 17. The rollers 17 are arranged such that the farther the respective virtual circular arcs are located from the end portion of the guide base 15 near the camshaft 3 (and thus the closer the respective virtual circular arcs are located to the end portion of the guide base 15 near the crankshaft 1), the shorter the radiuses of the respective virtual circular arcs are. Also, the rollers 17 are arranged such that the shorter the radius of any particular virtual circular arc is, the shorter the distances between the centers of the respective two adjacent pairs of the three rollers of which the particular virtual circular arc passes the centers.

Figure 8:
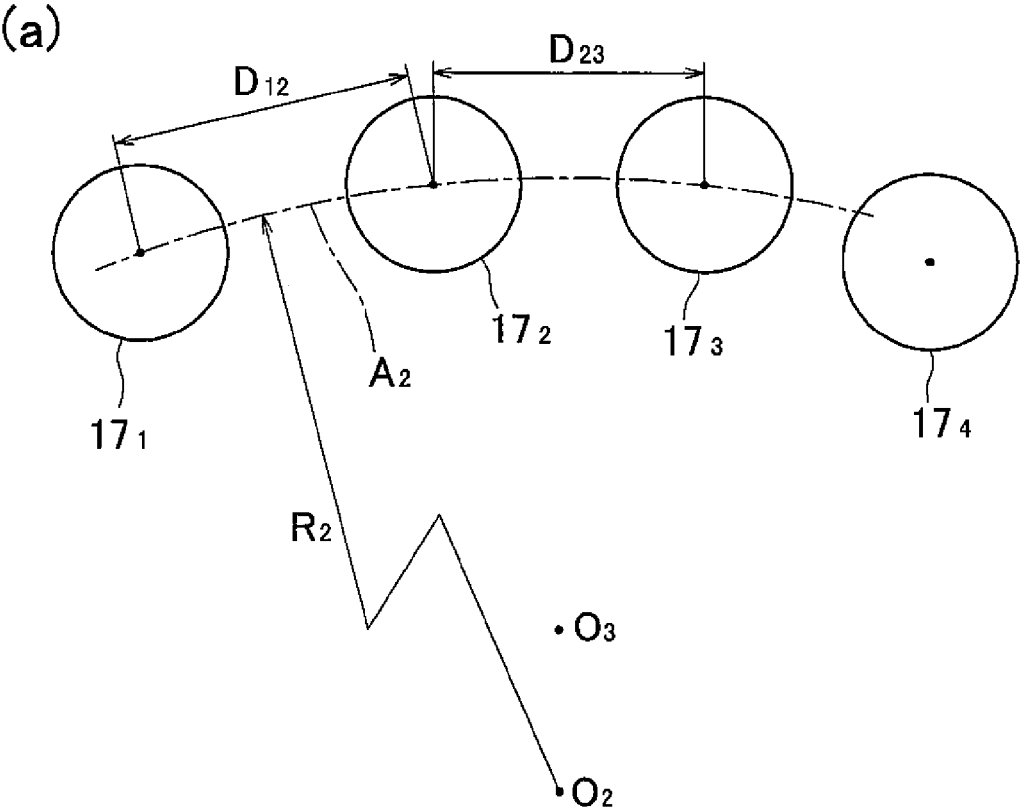
FIG. 8(a) is a schematic diagram illustrating a virtual circular arc drawn to pass the center of the second roller from the end portion of the guide base near the camshaft illustrated in FIG. 1 and the centers of the two rollers adjacent to both sides of the second roller.
FIG. 8(b) is a schematic diagram illustrating a virtual circular arc drawn to pass the center of the third roller from the end portion of the guide base near the camshaft illustrated in FIG. 1 and the centers of the two rollers adjacent to both sides of the third roller.
Figure 8:
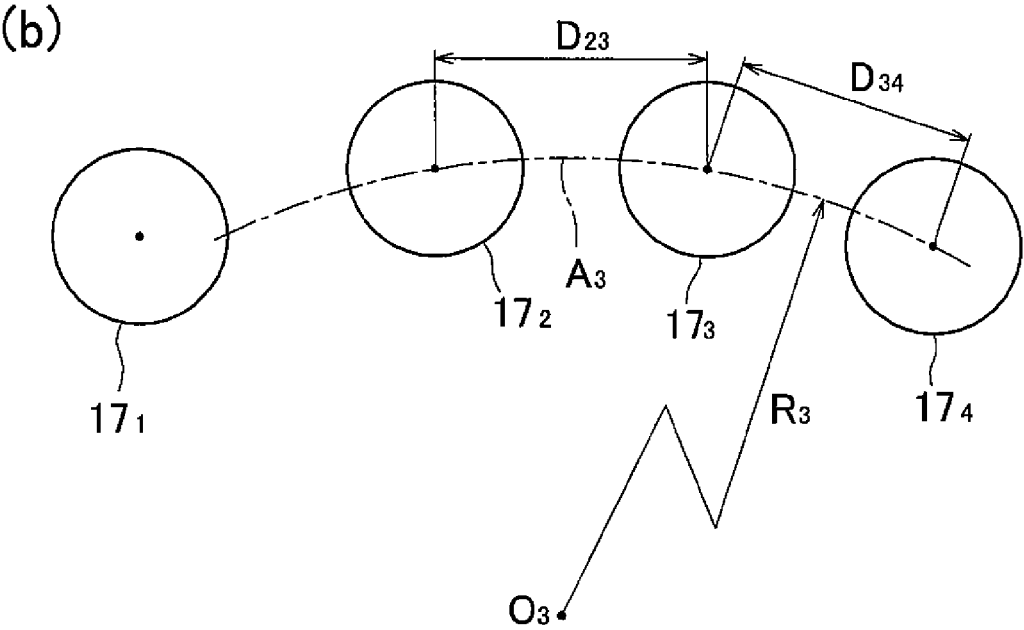

As illustrated in FIG. 8(a) and FIG. 8(b), the respective rollers 17 are hereinafter referred to as "roller $17_1$ (located closest to the camshaft 3)", "roller $17_2$", "roller $17_3$", "roller $17_4$" - - - from the end portion of the guide base 15 near the camshaft 3 toward the end portion of the guide base 15 near the crankshaft 1 so as to explain in detail about the arrangements of the respective rollers 17.

In FIG. 8(a), a virtual circular arc $A_2$ is shown which is drawn to pass the center of the roller $17_2$ and the centers of the roller $17_1$ and the roller $17_3$ adjacent to both sides of the roller $17_2$. In FIG. 8(b), a virtual circular arc $A_3$ is shown which is drawn to pass the center of the roller $17_3$ and the centers of the roller $17_2$ and the roller $17_4$ adjacent to both sides of the roller $17_3$. The rollers $17_1$ to $17_4$ are arranged such that the location of the center $O_2$ of the virtual circular arc $A_2$, drawn to pass the centers of the rollers $17_1, 17_2, 17_3$ illustrated in FIG. 8(a), is different from the location of the center $O_3$ of the virtual circular arc $A_3$, drawn to pass the centers of the rollers $17_2$, $17_3, 17_4$ illustrated in FIG. 8(b), and such that the radius $R_3$ of the virtual circular arc $A_3$, drawn to pass the centers of the rollers $17_2, 17_3, 17_4$ located at the side of the guide base 15 near the crankshaft 1, is shorter than the radius $R_2$ of the virtual circular arc $A_2$, drawn to pass the centers of the rollers $17_1, 17_2, 17_3$ located at the side of the guide base 15 near the camshaft 3.

Though not illustrated in the drawings, if virtual circular arcs $A_4$ to $A_6$ are drawn, each passing the center of one of the rollers $17_4, 17_5$ and $17_6$ and the centers of two of the rollers 17 adjacent to both sides of the one roller 17, the respective rollers $17_3$ to $17_7$ are also arranged such that the farther the respective virtual circular arcs $A_4$ to $A_6$ are located from the end portion of the guide base 15 near the camshaft 3 (and thus the closer the respective virtual circular arcs $A_4$ to $A_6$ are located to the end portion of the guide base 15 near the crankshaft 1), the shorter the radiuses $R_4$ to $R_6$ of the corresponding virtual circular arcs $A_4$ to $A_6$ are.

As described above, the rollers $17_1$ to $17_7$ are arranged such that the farther the respective virtual circular arcs $A_2$ to $A_6$ are located from the end portion of the guide base 15 near the camshaft 3 (and thus the closer the respective virtual circular arcs $A_2$ to $A_6$ are located to the end portion of the guide base 15 near the crankshaft 1), the shorter the radiuses $R_2$ to $R_6$ of the corresponding virtual circular arcs $A_2$ to $A_6$ are, which are each drawn to pass the center of one of the rollers $17_2, 17_3$, $17_4, 17_5$ or $17_6$ and the centers of two of the rollers 17 adjacent to both sides of the one roller 17.

It is to be understood that, as used herein, the language "the farther the respective virtual circular arcs $A_2$ to $A_6$ are located from the end portion of the guide base 15 near the camshaft 3 (and thus the closer the respective virtual circular arcs $A_2$ to $A_6$ are located to the end portion of the guide base 15 near the crankshaft 1), the shorter the radiuses $R_2$ to $R_6$ of the corresponding virtual circular arcs $A_2$ to $A_6$ are" is intended to include the situation where not all the radiuses $R_3$ to $R_6$ are smaller than the radiuses $R_2$ to $R_5$, respectively, but one or some of the radiuses $R_3$ to $R_6$ are equal to the radiuses of adjacent virtual circular arcs.

If the rollers $17_1$ to $17_7$ are arranged in this way, namely such that the farther the respective virtual circular arcs $A_2$ to $A_6$ are located from the end portion of the guide base 15 near the camshaft 3 (and thus the closer to the end portion of the guide base 15 near the crankshaft 1), the shorter the radiuses $R_2$ to $R_6$ of the corresponding virtual circular arcs $A_2$ to $A_6$ are, a winding angle of the chain 5 is made as large as possible around the driving sprocket 2 of the crankshaft 1 illustrated in FIG. 1, thus making it possible to suppress a load applied per tooth of the driving sprocket 2 of the crankshaft 1.

When the chain 5 is guided to travel by the respective rollers $17_1$ to $17_4$ illustrated in FIG. 8(a) and FIG. 8(b), the chain 5 is curved to a greater degree on the rollers $17_2$, $17_3$, $17_4$ illustrated in FIG. 8(b) than on the rollers $17_1$, $17_2$, $17_3$ illustrated in FIG. 8(a) in the travel direction of the chain 5. Therefore, a load applied to the roller $17_3$ by the chain 5 tends to be larger than a load applied to the roller $17_2$ by the chain 5.

In order to make loads applied to the respective rollers $17_1$ to $17_4$ uniform, the rollers $17_1$ to $17_4$ are arranged such that the distances between the centers of adjacent pairs of the rollers $17_2$, $17_3$, $17_4$ are shorter than the distances between the centers of adjacent pairs of the rollers $17_1$, $17_2$, $17_3$. Specifically, the distances $D_{12}$, $D_{23}$, $D_{34}$ between the centers of adjacent pairs of the rollers $17_1$ to $17_4$ are set to satisfy the following formula:

$$D_{12}+D_{23}>D_{23}+D_{34},$$

where $D_{12}$ is the distance between the centers of the rollers $17_1$ and $17_2$, $D_{23}$ is the distance between the centers of the rollers $17_2$ and $17_3$, and $D_{34}$ is the distance between the centers of the rollers $17_3$ and $17_4$.

Though not illustrated in the drawings, the other rollers $17_4$ to $17_7$ are also arranged such that the distances between the centers of adjacent pairs of the rollers $17_4$ to $17_7$ are shorter in the area where the radiuses R4 to R6 of the corresponding virtual circular arcs A4 to A6 are shorter.

Moreover, with reference to the relative position relationships between the respective rollers 17 and the chain tensioner 8 illustrated in FIG. 1, the rollers 17 located near the receiving portion 15a of the guide base 15 pressed by the chain tensioner 8 (located at the side of the guide base 15 near the crankshaft 1) are closer to the point of action of pressing force of the chain tensioner 8 than the rollers 17 located far from the receiving portion 15a (located at the side of the guide base 15 near the camshaft 3). Therefore, a larger load tends to be applied to the rollers 17 near the receiving portion 15a by the chain tensioner 8. In this regard too, in order to make loads applied to the respective rollers 17 uniform, it is preferable that the rollers 17 are arranged such that the farther the respective rollers 17 are located from the receiving portion 15a of the guide base 15 pressed by the chain tensioner 8 (and the closer to the receiving portion 15a thereof), the shorter the distances between the centers of adjacent pairs of the rollers 17 are.

As illustrated in FIG. 1, though the fixed chain guide 9 has, like the pivotable chain guide 7, a plurality of rollers 33 spaced apart from each other along the travel direction of the chain 5, the rollers 33 are arranged at equal intervals.

It is now described how the chain transmission device configured as described above operates.

While the engine is operating, the chain 5 travels between the driving sprocket 2 and the driven sprockets 4 such that torque is transmitted to the camshafts 3 from the crankshaft 1 by means of the chain 5. At this time, the pivotable chain guide 7, biased by the chain tensioner 8, presses the chain 5, so that the tension of the chain 5 is kept constant, and the fixed chain guide 9 controls vibration of the chain 5 while keeping an ideal travelling line of the chain 5.

The respective rollers 17 of the chain guide 7 rotate while contacting the edges of the back portions of respective pieces of the chain 5. Since the chain 5 is in rolling contact with the chain guide 7, resistance to travelling of the chain 5 is small, and thus transmission loss of torque is small.

The chain guide 7 according to this embodiment is configured such that the distances between the centers of adjacent pairs of the rollers 17 are shorter in the area where a larger load is applied to the rollers 17 (area of the guide base 15 near the crankshaft 1). Therefore, loads applied to the respective rollers 17 are made uniform. As a result thereof, it is possible to extend the service life of the roller shafts 16 supporting the respective rollers 17 as a whole, and to make the chain guide 7 excellent in durability.

The chain 5, by which rotation of the crankshaft 1 is transmitted to the camshafts 3, may be a silent chain, roller chain, or bush chain, which is identical to a roller chain except that it has no rollers, etc.

DESCRIPTION OF REFERENCE NUMERALS

2: driving sprocket
4: driven sprocket
5: chain
6: fulcrum shaft
7: chain guide
8: chain tensioner
15: guide base
16: roller shaft
17: roller

The invention claimed is:

1. A chain guide comprising:
a guide base configured to be arranged along a portion of an outer periphery of a chain for transmitting torque and elongated in a direction in which the chain travels;
a plurality of roller shafts attached to the guide base so as to be spaced apart from each other along the direction in which the chain travels; and
rollers rotatably supported by the roller shafts, respectively, wherein the guide base is supported so as to be pivotable about a first end portion of the guide base, and a second end portion of the guide base is pressed by a chain tensioner, and
wherein the rollers are arranged between the first end portion and the second end portion of the guide base such that a distance between centers of each adjacent pair of the rollers decreases as proximity to the second end portion of the guide base increases.

2. The chain guide according to claim 1, wherein the respective roller shafts, which support the rollers, are solid and columnar members to which bright quenching is performed.

3. The chain guide according to claim 1, wherein all of the rollers are arranged at unequal intervals.

4. A chain transmission device comprising:
a chain trained around a driving sprocket and a driven sprocket;
a pivotable chain guide provided at a loose side of the chain; and
a chain tensioner pressing the chain guide against the chain, wherein the chain guide is the chain guide according to claim 1.

5. A chain transmission device comprising:
a chain trained around a driving sprocket and a driven sprocket;
a pivotable chain guide provided at a loose side of the chain; and a chain tensioner pressing the chain guide against the chain wherein the chain guide is the chain guide according to claim 2.

6. A chain transmission device comprising:

a chain trained around a driving sprocket and a driven sprocket;

a pivotable chain guide provided at a loose side of the chain; and a chain tensioner pressing the chain guide against the chain wherein the chain guide is the chain guide according to claim 3.

\* \* \* \* \*